United States Patent [19]

Rissanen et al.

[11] Patent Number: 4,719,571
[45] Date of Patent: Jan. 12, 1988

[54] ALGORITHM FOR CONSTRUCTING TREE STRUCTURED CLASSIFIERS

[75] Inventors: Jorma I. Rissanen, Los Gatos, Calif.; Mati Wax, Haifa, Israel

[73] Assignee: International Business Machines Corporation, Armonk, N.Y.

[21] Appl. No.: 836,677

[22] Filed: Mar. 5, 1986

[51] Int. Cl.⁴ .............................................. G06F 1/00
[52] U.S. Cl. .................................................. 364/300
[58] Field of Search ................. 364/200 MS File, 300

[56] References Cited

U.S. PATENT DOCUMENTS 4,613,946 9/1986 Forman .......................... 364/300 X

OTHER PUBLICATIONS

L. Kanal, (1974): "Patterns in Pattern Recognition," IEEE Trans. on Information Theory, vol. 20, pp. 697–722.
P. M. Narendra & K. Fukunaga, (1977): "A Branch and Bound Algorithm for Feature Subset Selection," IEEE Trans. on Computers, vol. 26, pp. 917–922.
C. Y. Chang, (1973): "Dynamic Programming as Applied to Subset Selection in Pattern Recognition Systems," IEEE Trans. on Systems, Man and Cybernetics, vol. 3, pp. 166–171.
R. M. & J. D. Elashoff, & G. E. Goldman, (1967): "On the Choice of Variables in Classification Problems with Dichotomous Variables," Biometrika, vol. 54, pp. 668–670.
G. T. Toussaint, (1971): "Note on Optimal Selection of Independent Binary-Valued Features for Pattern Recognition," IEEE Trans. on Information Theory, vol. 17, p. 617.
T. M. Cover, (1974): "The Best Two Independent Measurement Are Not the Two Best," IEEE Trans. on Systems, Man and Cybernetics, vol. 4, pp. 116–117.
T. M. Cover & Van Campenhout, J.M.V, (1977): "On the Possible Ordering in the Measurement Selection Problem," IEEE Trans. on Systems, Man and Cybernetics, vol. 7, pp. 657–661.
P. M. Lewis, (1962): "The Characteristic Selection Problem in Recognition Systems," IRE Trans. on Information theory, vol. 8, pp. 171–178.
R. G. & G. Nagy, (1984): "Decision Tree Design Using Probabilistic Model," IEEE Trans. on Information Theory, vol. 30, pp. 191–199.
Gini index, L. Breiman, J. H. Friedman, R. A. Olshen, & C. Stone, (1984): Classification & Regression Trees, Wadsworth International Group, Belmont, CA.
A. Mabbet, M. Stone, and K. Washbrook, (1980): "Cross-Validatory Selection of Binary Variables in Differential Diagnosis," Appl. Statist., vol. 29, pp. 198–204, and Breiman et al (supra, 1984).

Primary Examiner—Raulfe B. Zache
Attorney, Agent, or Firm—Mark A. Haynes; Simon K. Lee

[57] ABSTRACT

In assigning features to nodes of a tree structured classifier and determining terminal nodes in response to a training set of objects each being determined by a plurality of features, a selected characteristic, such as a cost function based on the minimum description length, of the plurality of features unused at prior nodes is determined along the path from the root to the present node, a feature is then assigned to the node having a preferred value for the selected characteristic relative to the other features. Child nodes of the node are created in response to the assigned feature with features assigned thereto in a similar way. The preferred values for the selected characteristics of the assigned features for the child nodes of the node are combined and compared with the preferred value of their father node. Classification of the father node as a terminal is based upon such a comparison.

9 Claims, 4 Drawing Figures

```
       1268875420                    1255677668620
      1479999987430                  03698999999840
      14786566897440                  1699745899962
      03588521479542                  0389830079972
      04698400379541                  059960  059951
      0459840028952                   069940  059940
      0248852159831                   069970  17972
       14698569730                    29993359850
       0379*6542                      1999999840
       02899410                       279643310
       1699643100                    04852
      038***997620                    079443112110
      0799778999940                   1899766665430
      3996434579981                   18999999998741
      4983   037984                  299866799998530
      7970      24984                798312245789630
      8981001246963                  8970      2479730
      6998534579741                  99810       48962
      189988787641                   7997423468973
       1577765420                    1899999999631
         001010                       1588998521
                                        012220
```

ALGORITHM FOR CONSTRUCTING TREE STRUCTURED CLASSIFIERS

FIELD OF THE INVENTION

The present invention relates to constructing decision trees for classification of objects by their measured features as are commonly used in character and image recognition systems.

BACKGROUND OF THE INVENTION

Classification problems arise naturally in a variety of fields ranging from engineering and medicine to physics, chemistry, and biology. In most of the problems the number of the observed features may exceed hundreds or even thousands. Hence, it is inevitable that these features contain information which is either redundant or irrelevant to the classification task.

Since the classifier is constructed from a finite training-set, which is often small, it is important to base the classifier only on those features whose relevance to the classification task has been clearly demonstrated by the training-set. If less relevant features are included, the danger is that the classifier will be too finely tuned to the training-set, and as a result its performance on future data will drastically deteriorate.

Also there is a need to select a minimum number of relevant features motivated by economical and practical reasons; the smaller the number of features selected, the smaller is the number of measurements to be made, stored, and processed, and hence the less costly and complicated will be the classification procedure.

The problem of choosing the best subset of features has been extensively investigated (see e.g. Kanal, L. (1974): "Patterns in Pattern Recognition," IEEE Trans. on Information Theory, Vol. 20, pp. 697-722). It is well known that the optimal selection rule involves an exhaustive search over all the possible feature subsets. A direct search or even more sophisticated searches using techniques such as branch and bound, Narendra, P. M. and and Fukunaga, K. (1977): "A Branch and Bound Algorithm for Feature Subset Selection," IEEE Trans. on Computers, Vol. 26, pp. 917-922, or dynamic programming, Chang, C. Y. (1973): "Dynamic Programming as Applied to Subset Selection in Pattern Recognition Systems," IEEE Trans. on Systems, Man and Cybernetics. Vol. 3, pp. 166-171, are beyond the capabilities of present day computers even for a moderate number of features. For this reason, suboptimal search procedures have been proposed. In these schemes, the best feature subset is constructed sequentially by updating the current feature subset by only one feature at a time until a chosen criterion is minimized. If the starting point is the empty set the method is referred to as "bottom up", while if the starting point is the complete set of features, the method is referred to as "top down". It should be emphasized, however, as pointed out by Elashoff, J. D., Elashoff, R. M. and Goldman, G. E. (1967): "On the Choice of Variables in Classification Problems with Dichotomous Variables," Biometrika, Vol. 54, pp. 668-670; Toussaint, G. T. (1971): "Note on Optimal Selection of Independent Binary-Valued Features for Pattern Recognition," IEEE Trans. on Information Theory, Vol. 17, p. 617; and Cover, T. M. (1974): "The Best Two Independent Measurement Are Not the Two Best," IEEE Trans. on Systems, Man and Cybernetics, Vol. 4, pp. 116-117, that sequential selection cannot guarantee optimality of the feature subset even if the features are statistically independent. Moreover, as pointed out by Cover, T. M. and Van Campenhout, J. M. V. (1977): "On the Possible Ordering in the Measurement Selection Problem" IEEE Trans. on Systems, Man and Cybernetics, Vol. 7, pp. 657-661, it is theoretically possible that these suboptimal schemes will yield even the worst possible set of features. However, such extreme cases are undoubtedly rare, and sequential approaches appear to work quite well.

One sequential "bottom up" approach that leads to a very simple classification scheme is based on a decision tree. In this tree structure classification scheme, a sequence of tests, determined by a path in the tree that starts at the root, is performed. The path taken at each node depends on the result of the test performed at that node. When a terminal node is reached the object is assigned the class associated with that node.

Three major problems are encountered in constructing a tree structured classifier. The first problem is how to grow the tree; that is, how to choose the features to be used for "splitting" the nodes. The second problem is how to prune the tree; that is, how to choose the terminal nodes of the tree. The third and the easiest problem is how to choose the class-tag to be associated with each terminal node.

Various approaches to the construction of a tree structured classifier exist. All of them solve the last problem identically: the training-set is run through the tree and the number of samples from each class that reach the terminal nodes is counted. The class-tag assigned to a terminal node is the one with the largest count at that node. The first two problems, namely, the growing and pruning of the tree, are far more subtle and do not have a single clear-cut solution. The growing is usually done by different measures such as entropy, Lewis, P. M. (1962): "The Characteristic Selection Problem in Recognition Systems," IRE Trans. on Information theory, Vol. 8, pp. 171-178, and Casey, R. G. and Nagy, G. (1984): "Decision Tree Design Using Probabilistic Model," IEEE Trans. on Information Theory, Vol. 30, pp. 191-199, and Gini index, Breiman, L., Friedman, J. H., Olshen, R. A. and Stone, C. (1984): Classification and Regression Trees, Wadsworth, International Group, Belmont, Calif., while the pruning is done by estimating the misclassification error, Mabbet, A., Stone, M. and Washbrook, K. (1980): "Cross-Validatory Selection of Binary Variables in Differential Diagnosis," Appl. Statist., Vol. 29, pp. 198-204, and Breiman et al (supra, 1984).

There is no prior art method which both determines features for growing a tree and when to prune the tree. So there is always a different criteria for pruning a tree required that the criteria for growing the tree. The entropy based method selects a feature for a node that minimizes the "entropy" of the information to be stored at the node. This entropy method never indicates when it is desirable to prune the tree.

The Gini index tends to find the split making the probability at nodes close to equal. It is a merely intuitive approach to growing a tree with no provable properties. Further the Gini index provides no pruning criteria.

The prior pruning techniques operated by building a complete decision tree using all of the features that are measured and then collapsing the tree by examining each node and minimizing the number of misclassification errors, plus a fudge factor that is subjectively assigned to the problem most often based on the size of the tree. Subjectively assigned fudge factors must be selected by experts in the classification problem involved in order to obtain good results in most cases.

Another problem with this prior approach to pruning is that predictive estimates of misclassification error cannot be obtained from the same training sample that was used to construct the tree. Thus a fresh sample is needed to determine reasonable pruning characteristics. Often this was approached in the prior art by splitting a training sample into two parts, a first part used to construct the tree and a second part to test the tree for pruning. Thus, not only is the prior approach expensive, requiring expert attention to the selection of fudge factors, but it is wasteful of statistics.

SUMMARY OF THE INVENTION

The present invention provides a single criterion based upon the features in the training set for both growing and pruning the tree. The inventive method objectively grows and prunes a classification tree based upon a training-set for any classification problem presented using in one aspect a characteristic defined as the minimum description length or, in another aspect, the related predictive minimum description length. The minimum description length and predictive minimum description length principles are described in detail in Rissanen, J., "Minimum Description Length Principle", *Encyclopedia of Statistical Sciences*, Vol. V, S. Kotz and N. L. Johnson, editors, (John Wiley and Sons, 1985, New York), pp. 523-527; and Rissanen, J., "Stochastic Complexity and Modelling" IBM Research Report, No. RJ 5002 (1986).

The invention can be characterized as a method for assigning features to nodes of a tree structure classifier and for determining terminal nodes in response to a training-set of objects, each of such objects being determined by a plurality of features. The method comprises the steps at each node of the tree of:

(1) determining a selected characteristic of a subset of the plurality of features unused at prior nodes;

(2) assigning a feature to the node having a preferred value for the selected characteristic relative to the other features;

(3) splitting the node based upon the assigned feature to create child nodes;

(4) for each child node, determining the selected characteristic for a subset of the plurality of features unused at prior nodes and assigning a feature to the child node having a preferred value for the selected characteristic relative to the other features;

(5) generating a combination of the values for the selected characteristics of the assigned features for the child nodes of the node; and (6) classifying the node as a terminal node in response to a comparison of the combination of values for the features assigned to the child nodes and the value for the feature assigned to the node.

DETAILED DESCRIPTION

With reference to the figures, a detailed description of the preferred embodiment is described.

FEATURE ASSIGNMENT ALGORITHM

Figure 1A:
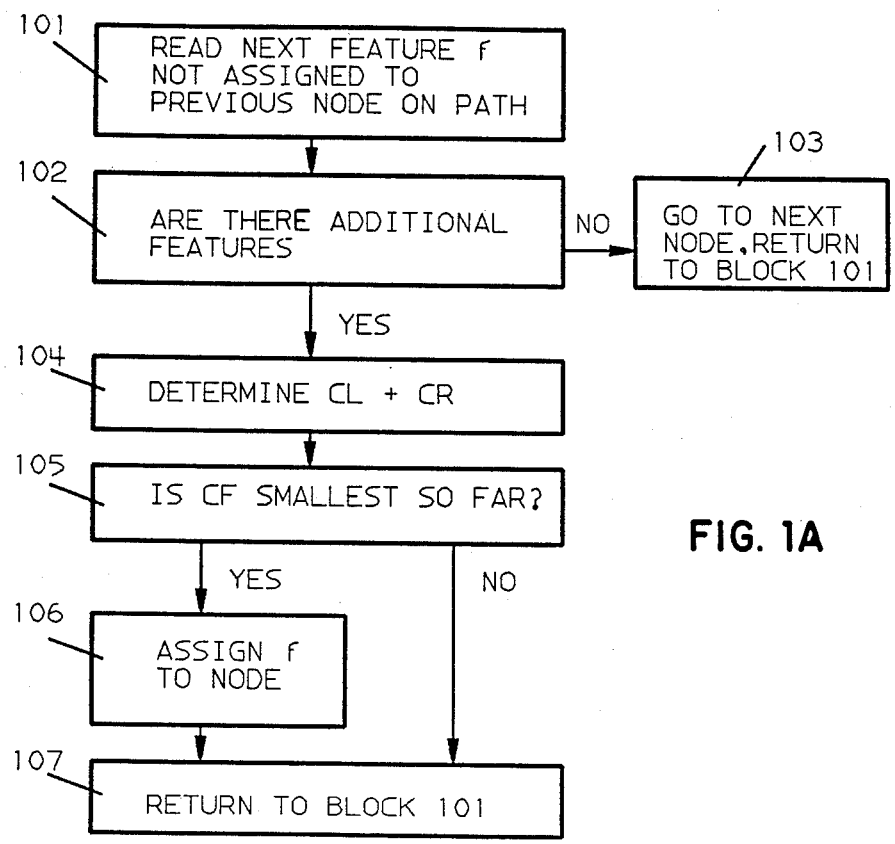
FIGS. 1A and 1B are flow charts illustrating the feature assignment and pruning methods respectively of a preferred embodiment of the present invention.

With reference to FIG. 1A, the method according to the present invention of assigning features to nodes of a classification tree is described.

The algorithm reads the nodes of an infinite binary tree in the following order: First the root, then the left son, the right son, the left son of the left son, the right son of the left son, etc.

Notations used in describing the preferred algorithm are as follows:

NODE is the current (father) node;
N=# of elements reaching that node;
N0=# elements of these whose class is 0.

A selected characteristic, termed a cost function, having a value C for a feature used in splitting a node is defined by the following equation (1) based on the Minimum Description Length for the feature at the node:

$$C = N\, h(N0/N) + (\tfrac{1}{2})\log((2N^{*}3)/(N(N-N0))), \quad (1)$$

where $N^{*}3$ is the third power of N, and $$h(p) = -p\log p - (1-p)\log(1-p).$$

The feature assignment algorithm is initialized at a root node. The steps are outlined below as illustrated in FIG. 1A.

1. Read next feature not already assigned to nodes along the path from the current node to the root, and read its value for all elements in training sample (Block 101).
2. Determine whether there are additional features to be tested (Block 102). If one exist, then go to the next node in tree and to Block 101 (Block 103).
3. Let NL and NR denote the number of elements in the training sample whose feature value is 0 (for left) and 1 (for right), respectively. Compute CL and CR from formula (1) with N and N0 replaced by NL and NL0, respectively, and NR and NR0, respectively, and take the sum of CL+Cr (Block 104).
4. Is CF=CL+CR smallest so far found (Block 105)?
5. If yes, assign to NODE the current feature (Block 106). Return to Block 101 (Block 107).
6. If no, return to Block 101 (Block 107).

PRUNING ALGORITHM

Figure 1B:
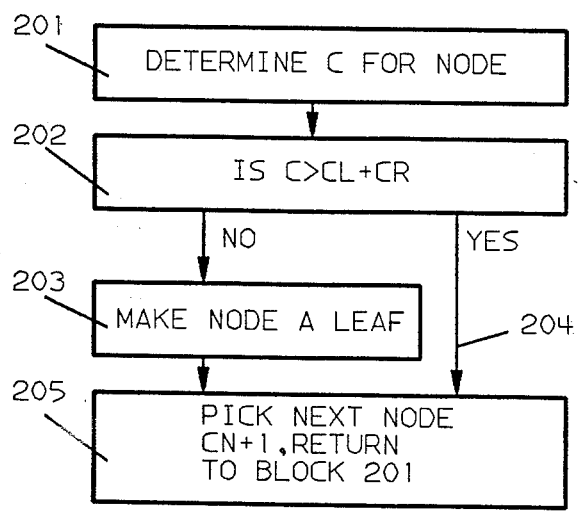

The pruning algorithm for nodes of the tree to which a feature has been assigned is outlined below with reference to FIG. 1B.

1. Determine C according to equation (1) (Block 201).
2. Is C>CL+CR (Block 202)?
3. If no, make the node a leaf (prune). Go to Block 205 (Block 203).
4. If yes, go to Block 205 (Block 204).
5. Pick the next node. Go to Block 201 (Block 205).

Alternatively, the cost function given by equation (1) may be replaced by the cost function given by the following equation (2) based on the Predictive Minimum Description Length for the node:

$$C = \log((N+1)!/(N0!(N-N0)!)) \quad (2)$$

where ! is a symbol commonly used to designate a factorial operation.

Because the cost C given by equations (1) and (2) is much greater than the the cost of describing features assigned to the nodes, the feature cost may be ignored in these approaches.

RISK AS A COST FUNCTION

There is a natural cost function, $C(x_{t+1}, \hat{x}_{t+1})$, called the risk, which is defined to be 0, if the classification is correct; i.e. if $x_{t+1} = \hat{x}_{t+1}$, and 1, otherwise. Hence, for the entire training sample the risk with some decision tree is the number of misclassifications that have been made.

Technically, the risk function can still be represented as a predictive code length (predictive minimum description length) for a special distribution or as true prediction error, so that the first feature assignment algorithm described above applies with the modification that the cost function C no longer can be calculated from a formula but it has to be evaluated recursively at each node for each examined element in the training sample that reaches that node. (Actually, this is the way even the second of the above given cost functions (equation (2)), involving the factorials, is preferrably evaluated.) However, the numerical value of the risk is generally speaking a lot smaller than the other cost functions. This involves a complication in the pruning algorithm, because it is no longer justified to ignore the cost of encoding the features themselves that were assigned to the nodes, as was done with the previous cost functions. As a result, we shall describe a new algorithm that does the job of both of the growing and pruning algorithms.

But first, we must describe the classification rule $\hat{x}_{t+1}(x^t)$, where $x^t = x_1, \ldots, x_t$ denotes the sequence of the class tags of the past elements. We take it as the majority rule: $\hat{x}_{t+1}(x^t) = 0$ if the number of 0 tags in the past sequence, $n_0(x^t)$, satisfies the following condition: either $n_0(x^t) > t/2$ or in case $n_0(x^t) = t/2$ if $n_0(x^{t-1}) > t/2$. Otherwise, $\hat{x}_{t+1}(x^t) = 1$.

At each node we describe the recursive computation of a cost as a function of that portion x of the training sample that has so far arrived at this node. Let the feature f split x into the substring w(f), whose feature value is "white", say, and the remaining substring b(f), whose feature value under f is "black". Let z denote the next sample arriving at the node. If feature value f(z) is either white or black depending on f. In the former case we may call the substring w(f) its "past" relative to f, and in the latter case b(f) is its past. The past of z is important, because we can use the errors that would have been made to predict the past as an indication of how well we can predict z itself. In fact, let C(w(f)) and C(b(f)), respectively, denote the risk, determined by the above described majority prediction classification rule, when the past of z is predicted, and let f* be the feature which minimizes this risk. We now define $C^*(xz) = C^*(x)$, if the prediction of the class of z is correct when the prediction is done based upon its past, determined by the winning feature f*. Otherwise, $C^*(xz) = C^*(x) + 1$.

The feature assigned to the node in question is the last winning feature f* when the entire training sample has been processed.

The pruning is done by the rule: Prune the tree at the first node along each path from the root where $C^*(X) > C(X)$. Here, X refers to that portion of the training sample that reaches this node. Both risks are defined above. In particular, C(X) at the root node is the risk resulting when the training sample is predicted without using any features. At the other nodes it is the risk resulting from prediction when the best feature f* is applied to its father node.

EXPERIMENTAL RESULTS

Figures 2, 3:
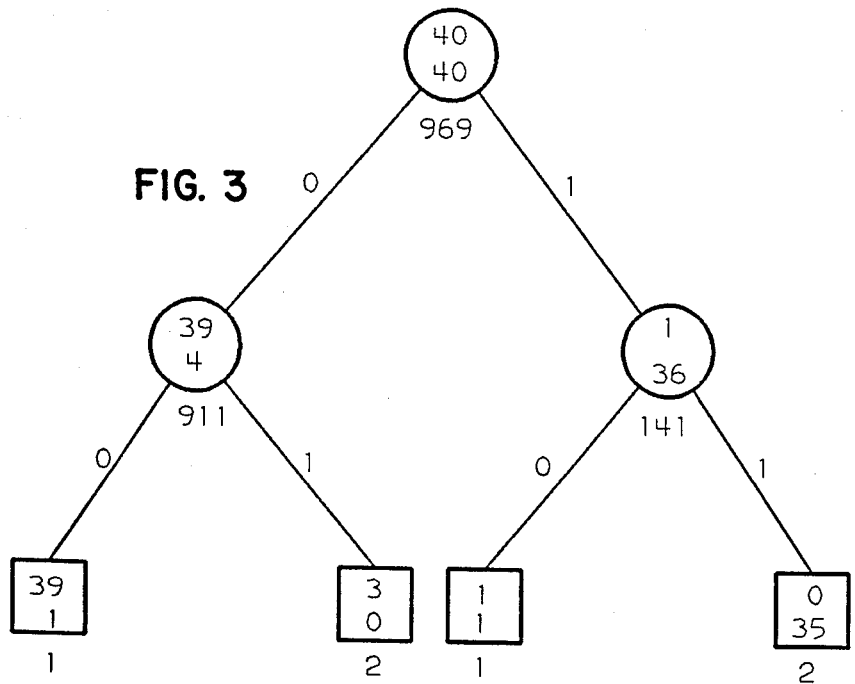
FIG. 2 shows two composite digitized fonts of the letter g used to illustrate the present invention.
FIG. 3 is a chart showing a tree structured classifier.

In this section we present experimental results obtained by applying the classification scheme based on equation (1) described above to an automatic character recognition problem. We want to distinguish between two different fonts of the character g. The training-set consists of 40 scanned black-and-white images of each font, each image consisting of 1536 picture-cells (pels). FIG. 2 shows a superposition of the 20 images of each font. The integers indicate the relative frequency that a given pel is black in the forty training samples of that font. Asterisks show positions which are black in all of the samples, blanks correspond to all white. Zeros stand for relative frequencies in the range of 0 to 0.1.

The set of features for the classification task was defined as the binary valued content of the individual pels. The application of the splitting and pruning criteria, given in equation (1), resulted in the tree structured classifier shown in FIG. 3. The number below the interior nodes designated by circles indicate when pel is the assigned feature to be tested at the node. The number below the terminal nodes designated by squares indicate the class-tag assigned to the leaf. The numbers inside the nodes indicate the number of training samples that reached the node from each of the two classes, with the upper value indicating class 1 and the lower value indicating class 2.

Using this tree to classify a new batch of 40 characters, 20 of each font, resulted in an error rate of 6.25 percent, which is rather low in view of the high variability of the samples.

CONCLUDING REMARKS

The present invention provides a new way to design tree structured classifiers. Unlike the existing techniques, where the node splitting and pruning rules are derived from a more or less ad hoc basis, the rules according to the preferred embodiment of the present invention result from the application of the intuitively appealing minimum description length MDL principle. According to this, the classification tree is regarded as a model, where the number of parameters grows with the number of nodes. When such a model is used to "explain" the regular features in the training set, formalized by means of the coding of the data, the complexity of the model must be included. This, then, leads to the simple nodewise criterion: compare the total code length needed to describe the class-tags at a node with the shortest combined code length of the son-nodes. If it is smaller, prune the tree at the node; otherwise, split it.

The new pruning scheme is computationally simpler than the cross-validatory pruning methods of Mabbet et al (supra 1980) and Brieman et al (supra 1984). Even if one wishes to perform the pruning only after the tree has been grown to its maximum size, so as to have some look-ahead capabilities, the procedure is still simpler both conceptually and computationally. One has only to compare the code length of any internal node to the sum of the code lengths of its leaves; if it is smaller the tree is pruned at that node. This comparison can be done efficiently using the postorder data structure, wherein a node's sub-trees are inspected before the node itself is.

The extension of the splitting and pruning criteria to the case of multiple classes is straightforward. Nevertheless, when the number of classes is large, the "twoing" method described in Brieman et al (supra 1984), at least for the top part of the tree, is preferred because of its efficient implementation. At each node, this scheme finds the two superclasses which in some sense are not dissimilar as well as the best split according to these two superclasses. In fact, the conglomeration of classes into superclasses is very well justified from the MDL principle point of view. Notice that the code length of the parameters grows linearly with the number of classes while the code length of the data does not necessarily decrease in such a rate. Thus, in general, it seems that the total code length is minimized if classes are grouped to superclasses. Indeed, one could even use the MDL principle to find the best superclasses.

A preferred implementation of the present invention has been described for the purposes of illustration. Those skilled in the art will recognize that modifications and extensions of the methods described herein can be made without departing from the spirit and scope of the invention. It is intended that the invention be defined by the following Claims.

We claim:

1. A method implemented in data processing apparatus for assigning features to nodes of a tree structured classifier in response to a training set of objects, each of such objects being determined by a plurality of features, comprising the steps at each current node of the tree of:
determining a selected characteristic of a subset of the plurality of features unused at prior nodes, the selected characteristic being a cost function based on code length; and
assigning a first feature to the node having a preferred value for the selected characteristic relative to features other than said first feature.

2. The method of claim 1, further including the steps of:
creating child nodes in response to said first feature;
determining for each child node the selected characteristic for a subset of the plurality of features unused at prior nodes and assigning a respective second feature to the child node having a preferred value for the selected characteristic relative to the features other than said respective second feature;
generating a combination of a plurality of values each corresponding to the value for the selected characteristic of the respective second feature for a respective one of said child nodes of the current node; and
classifying the node as a terminal node in response to a comparison of said combination and the preferred value of the current node.

3. A method implemented in data processing apparatus for assigning features to nodes of a tree structured classifier and for determining terminal nodes in response to a training set of objects, each of such objects being determined by a plurality of features, comprising the steps at each current node of the tree of:
determining a selected characteristic of a subset of the plurality of features unused at prior nodes;
assigning a first feature to the node having a preferred value for the selected characteristic relative to features other than said first feature;
creating child nodes in response to said first feature;
determining for each child node the selected characteristic for a subset of the plurality of features unused at prior nodes and assigning a respective second feature to the child node having a preferred value for the selected characteristic relative to features other than said respective second feature;
generating a combination of a plurality of values each corresponding to the value for the selected characteristic of the respective second feature for a respective one of said child nodes of the current node; and
classifying the node as a terminal node in response to a comparison of said combination and the preferred value of the current node.

4. The method of claim 3, wherein the selected characteristic comprises a cost function based on a principle known as the Minimum Description Length Principle.

5. The method of claim 3, wherein the selected characteristic comprises a cost function C defined as follows:

$$C = N\,h(NO/N) + (\tfrac{1}{2})\log((2N^{*}3)/(N(N-NO)),$$

where $N$ = the number of elements reaching a node,
$NO$ = number of elements of a selected class resulting from a split of the node based on the feature,
$N^{*}3$ = third power of N, and
$h(p) = -p\log p - (1-p)\log(1-p)$, where $p$ equals $NO/N$.

6. The method of claim 3, wherein the selected characteristic comprises a cost function C defined as follows:

$$C = \log((N+1)!/(NO!(N-NO)!)),$$

where $n$ = number of elements reaching a node, and
$NO$ = number of a selected class resulting from a split of the node based on the feature.

7. The method of claim 3, wherein the selected characteristic comprises a cost function based on a principle known as the Predictive Minimum Description Length Principle.

8. A method implemented in data processing apparatus for assigning features to nodes of a tree structured classifier and for determining terminal nodes in response to a training set of objects, each of such objects being determined by a plurality of features, comprising the steps at each current node of:
determining a true prediction error for a subset of the plurality of features unused at prior nodes;
assigning a first feature to the node having a small prediction error relation to features other than said first feature;
creating child nodes in response to said first feature;
determining for each child node a prediction error for a subset of the plurality of features unused at prior nodes and assigning a respective second feature to the child node having a small prediction error relative to features other than said repetitive second feature; and
generating a sum of all prediction errors each corresponding to the small prediction error of a respective one of said child nodes for the current node; and
classifying the node as a terminal node if said sum is greater than the prediction error of the current node.

9. A method implemented in data processing apparatus for assigning features to nodes of a tree structured classifier and for determining terminal nodes in response to a training set of objects, each of such objects being determined by a plurality of features, comprising the steps at each current node of:

determining a minimum description length for a subset of the plurality of features unused at prior nodes;

assigning a first feature to the node having a small minimum description length relative to features other than said first feature;

creating child nodes in response to said first feature;

determining for each child node a minimum description length for a subset of the plurality of features unused at prior nodes and assigning a respective second feature to the child node having a small minimum description length relative to features other than said respective second feature; and generating a sum of all minimum description lengths each corresponding to the small minimum description length of a respective one of said child nodes for the current node; and classifying the node as a terminal node if said sum is greater than the minimum description length of the current node.

* * * * *

UNITED STATES PATENT AND TRADEMARK OFFICE
CERTIFICATE OF CORRECTION

PATENT NO. : 4,719,571

DATED : January 12, 1988

INVENTOR(S) : J. J. Rissanen and Mati Wax

It is certified that error appears in the above-identified patent and that said Letters Patent is hereby corrected as shown below:

Col. 2, line 54, "that" should be -- than --.
Col. 4, line 32, delete "11".
Col. 4, line 37, "one" should be -- none --.
Col. 5, line 45, "It" should be -- Its --.
Col. 7, line 4, "not" should be -- most --.

Front page at (75), "Jorma I. Rissanen" should be -- Jorma J. Rissanen --.

Signed and Sealed this

Thirty-first Day of May, 1988

Attest:

DONALD J. QUIGG

Attesting Officer

Commissioner of Patents and Trademarks